(12) United States Patent
Lee (10) Patent No.: US 12,438,413 B2
(45) Date of Patent: Oct. 7, 2025

(54) MOTOR

(71) Applicant: LG INNOTEK CO., LTD., Seoul (KR)

(72) Inventor: Seong Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 313 days.

(21) Appl. No.: 17/789,106

(22) PCT Filed: Nov. 11, 2020

(86) PCT No.: PCT/KR2020/015745
§ 371 (c)(1),
(2) Date: Jun. 24, 2022

(87) PCT Pub. No.: WO2021/141230
PCT Pub. Date: Jul. 15, 2021

(65) Prior Publication Data
US 2023/0047704 A1   Feb. 16, 2023

(30) Foreign Application Priority Data

Jan. 7, 2020   (KR) ........................ 10-2020-0002121

(51) Int. Cl.
*H02K 5/22* (2006.01)
(52) U.S. Cl.
CPC ......... *H02K 5/225* (2013.01); *H02K 2203/09* (2013.01)
(58) Field of Classification Search
CPC ..... H02K 5/225; H02K 2203/09; H02K 3/522
(Continued)

(56) References Cited

U.S. PATENT DOCUMENTS

| 2003/0094879 A1* | 5/2003 | Kobayashi | H02K 15/0062 |
| | | | 310/238 |
| 2012/0098363 A1* | 4/2012 | Elser | H02K 3/522 |
| | | | 310/71 |

(Continued)

FOREIGN PATENT DOCUMENTS

| JP | 2000-127198 A | 5/2000 |
| JP | 2009-290921 A | 12/2009 |

(Continued)

*Primary Examiner* — Terrance L Kenerly
*Assistant Examiner* — Theodore L Perkins
(74) *Attorney, Agent, or Firm* — Birch, Stewart, Kolasch & Birch, LLP (57) ABSTRACT

Disclosed is a motor comprising: a stator; a rotor provided inside the stator; and a shaft coupled to the rotor, wherein the stator comprises a stator core, a coil wound around the stator core, and an insulator arranged between the stator core and the coil, and the insulator comprises an upper insulator and a lower insulator. An upper body of the upper insulator comprises: a first side wall part; a second side wall part arranged to the spaced apart from the first side wall part; and a first cover part extending from an end of the first side wall part and connected to an end on one side of the second side wall part, wherein the number of a plurality of first grooves formed on the first side wall part is different from the number of a plurality of second grooves formed on the second side wall part. Accordingly, when a coil with an increased diameter is used, the performance of the motor can be improved by implementing asymmetric wiring of the coil by using the insulator for guiding the arrangement of the coil.

7 Claims, 11 Drawing Sheets

(58) Field of Classification Search
USPC .......................................................... 310/71
See application file for complete search history.

(56) References Cited

U.S. PATENT DOCUMENTS

| | | | |
|---|---|---|---|
| 2012/0112582 A1* | 5/2012 | Kim | B62D 5/0403 |
| | | | 310/71 |
| 2015/0076944 A1 | 3/2015 | Shim et al. | |
| 2016/0294248 A1* | 10/2016 | Atarashi | H02K 5/16 |
| 2017/0250585 A1* | 8/2017 | Ohashi | H02K 3/522 |
| 2017/0310183 A1* | 10/2017 | Jang | H02K 5/22 |
| 2019/0089108 A1 | 3/2019 | Lee et al. | |

FOREIGN PATENT DOCUMENTS

| | | |
|---|---|---|
| JP | 2013-212008 A | 10/2013 |
| JP | 2016-195504 A | 11/2016 |
| KR | 10-2015-0031634 A | 3/2015 |
| KR | 10-2017-0102744 A | 9/2017 |
| KR | 10-2019-0119304 A | 10/2019 |
| WO | WO 2014/167668 A1 | 10/2014 |

* cited by examiner

MOTOR

CROSS REFERENCE TO RELATED APPLICATIONS

This application is the National Phase of PCT/KR2020/015745 filed on Nov. 11, 2020, which claims priority under 35 U.S.C. § 119(a) to Patent Application No. 10-2020-0002121 filed in the Republic of Korea on Jan. 7, 2020, all of which are hereby expressly incorporated by reference into the present application.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, the motor may be used as a motor for a vehicle in which a motor is used in an electronic power steering system or active roll stabilizer (ARS).

A motor may include a housing, a shaft, a stator disposed on an inner circumferential surface of the housing, a rotor disposed on the shaft, a busbar disposed on the stator, and the like. In this case, the stator induces an electrical interaction with the rotor to induce rotation of the rotor.

In addition, the busbar may include a busbar body and a plurality of terminals disposed on the busbar body. In this case, one sides of the terminals may be connected to connection ends of coils of the stator, and the other sides may be connected to external power sources through cables. In addition, the busbar body may be referred to as a busbar holder.

In this case, the busbar may be formed through an injection molding manner.

However, a problem that distances between the terminals are not maintained due to an injection pressure generated in a process of injection molding the busbar body using a molded part occurs. In addition, such a problem may cause that the motor is determined to be defective due to a violation of insulation standards.

In addition, when the busbar body is injection-molded, pins of an injection mold are disposed between the terminals in order to maintain the distances between the terminals. In addition, an injection material may not be introduced into regions in which the pins are disposed, and thus grooves or holes may be formed according to the shapes of the pins. Accordingly, there may be a problem that the injection material which is an insulator is not disposed between the terminals. In addition, a violation of insulation standards may occur due to positions at which the grooves or holes are formed.

Accordingly, there is a request for a busbar in which an injection material is disposed between terminals while maintaining distances between terminals against an injection pressure.

Technical Problem

The present invention is directed to providing a busbar in which an insulation distance between terminals is maintained against an injection pressure generated during injection molding and a motor including the same.

The present invention is directed to providing a busbar in which a busbar body which is an injection part is disposed between terminals even after injection molding is performed to satisfy insulation standards and a motor including the same.

Objectives to be solved by the present invention are not limited to the above-described objectives, and other objectives, which are not described above, will be clearly understood by those skilled in the art from the following description.

Technical Solution

One aspect of the present invention provides a motor including a stator, a rotor disposed inside the stator, a shaft coupled to the rotor, and a busbar disposed on the stator, wherein the busbar includes a busbar holder and a plurality of terminals disposed on the busbar holder, the plurality of terminals includes a first terminal and a second terminal disposed apart from the first terminal, each of the first terminal and the second terminal includes a body disposed in the busbar holder and a protrusion extending from the body, the busbar holder includes a first region overlapping the protrusion in a radial direction and a groove, the protrusion of the first terminal is disposed in the groove, and the first region overlaps the second terminal in an axial direction.

The groove may be formed in an upper surface of the busbar holder to expose an upper surface of the protrusion of the first terminal.

The plurality of terminals may include a third terminal disposed apart from the first terminal and the second terminal in the radial direction, and the third terminal may include a body disposed in the busbar holder and a protrusion extending from the body.

The protrusion of the third terminal may not overlap the protrusion of the first terminal and the protrusion of the second terminal in the radial direction and a circumferential direction. In addition, the second terminal may be disposed between the first terminal and the third terminal, and a radius (R1) of the first terminal may be smaller than a radius (R2) of the second terminal.

Another aspect of the present invention provides a motor including a stator, a rotor disposed inside the stator, a shaft coupled to the rotor, and a busbar disposed on the stator, wherein the busbar includes a busbar holder and a first terminal and a second terminal which are coupled to the busbar holder, each of the first terminal and the second terminal includes a body and a protrusion protruding from the body, the protrusion of the first terminal does not overlap the protrusion of the second terminal in a radial direction, and the protrusion of the first terminal does not overlap the busbar holder in an upward direction and overlaps the busbar holder in a circumferential direction.

The protrusion of the first terminal may not overlap the protrusion of the second terminal in the radial direction.

The first terminal and the second terminal may be disposed apart from each other in the radial direction.

Still another aspect of the present invention provides a motor including a stator, a rotor disposed inside the stator, a shaft coupled to the rotor, and a busbar disposed on the stator, wherein the busbar includes a busbar holder and a first terminal coupled to the busbar holder, the first terminal includes a body, a protrusion protruding from the body, and terminal parts spaced apart from the protrusion and extending from the body, the busbar holder includes a groove formed to expose the protrusion of the first terminal, and a part of the busbar holder is disposed between the protrusion of the first terminal and the terminal parts of the first terminal.

The terminal parts may be coupled to coils of the stator, and the protrusion may be disposed between the terminal parts.

The busbar holder may include a groove through which the protrusion of the first terminal is exposed, and the groove may be concavely formed in an upper surface of the busbar holder.

The protrusion of the first terminal may be provided as two or more protrusions, and the two or more protrusions of the first terminal may be disposed apart from each other. In this case, the two or more protrusions of the first terminal may be disposed apart from each other in a circumferential direction.

An upper surface of the body of the first terminal may be in contact with the busbar holder.

Advantageous Effects

According to embodiments, a distance between a first terminal and a second terminal in a radial direction can be maintained using protrusions formed on the terminals when a busbar holder is injection-molded.

In addition, the insulation performance between the terminals can be secured by arranging a molded part in the radial direction from the protrusion of the first terminal. In this case, the molded part can be disposed in an axial direction of the second terminal. That is, since the molded part is disposed in a region in which the radial direction from the protrusion of the first terminal intersects the axial direction from the second terminal, the insulation and insulation performance between the first terminal and the second terminal can be secured. In this case, the molded part can also be disposed between a body of the first terminal and a body of the second terminal to satisfy insulation standards of a user.

Various useful advantages and effects of the embodiments are not limited to the above-described contents and will be more easily understood from descriptions of the specific embodiments.

MODES OF THE INVENTION

Hereinafter, exemplary embodiments of the present invention will be described in detail with reference the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals in all of the figures, and redundant descriptions will be omitted.

Figure 1:
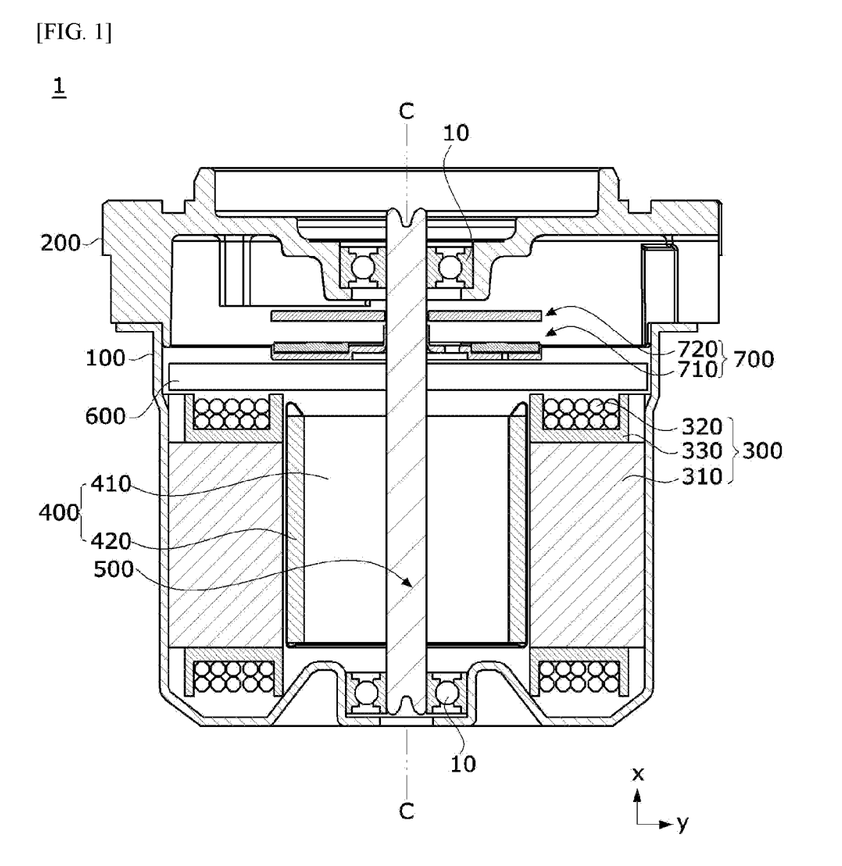
FIG. 1 is a view illustrating a motor according to an embodiment.

FIG. 1 is a view illustrating a motor according to an embodiment. In FIG. 1, an x direction may be an axial direction, and a y direction may be a radial direction. In addition, the axial direction and the radial direction may be perpendicular to each other. In addition, the axial direction may be a longitudinal direction of a shaft 500.

Referring to FIG. 1, a motor 1 according to the embodiment may include a housing 100 having one side at which an opening is formed, a cover 200 disposed on the housing 100, a stator 300 disposed in the housing 100, a rotor 400 disposed inside the stator 300, a shaft 500 which rotates along with the rotor 400, a busbar 600 disposed on the stator 300, and a sensor part 700 which detects rotation of the shaft 500. In this case, the term "inward" may be a direction toward a center C, and the term "outward" may be a direction opposite to "inward."

The housing 100 and the cover 200 may form an exterior of the motor 1. In addition, an accommodation space may be formed by coupling the housing 100 and the cover 200. Accordingly, as illustrated in FIG. 1, the stator 300, the rotor 400, the shaft 500, and the like may be disposed in the accommodation space. In this case, the shaft 500 is rotatably disposed in the accommodation space. Accordingly, the motor 1 may further include bearings 10 disposed on upper and lower portions of the shaft 500.

The housing 100 may be formed in a cylindrical shape. In addition, the housing 100 may accommodate the stator 300, the rotor 400, and the like therein. In this case, a shape or material of the housing 100 may be variously changed. For example, the housing 100 may be formed of a metal material which firmly withstands even at high temperatures.

The cover 200 may be disposed on an open surface of the housing 100, that is, on the housing 100 to cover the opening of the housing 100. In this case, a shape or material of the cover 200 may be variously changed. For example, the cover 200 may be formed of a metal material which firmly withstands even at high temperatures.

The stator 300 may be disposed inside the housing 100. In this case, the stator 300 may be supported by an inner circumferential surface of the housing 100. In addition, the stator 300 may be disposed outside the rotor 400. That is, the rotor 400 may be rotatably disposed inside the stator 300.

Referring to FIG. 1, the stator 300 may include a stator core 310, coils 320 wound around the stator core 310, and an insulator 330 disposed between the stator core 310 and the coils 320.

The coils 320 which generate a rotating magnetic field may be wound around the stator core 310. In this case, the stator core 310 may be formed as one core or formed by coupling a plurality of divided cores.

In addition, the stator core 310 may be formed in a form in which a plurality of plates having thin plate shapes are stacked but is not necessarily limited thereto. For example, the stator core 310 may also be formed as one single part.

The stator core 310 may include a yoke (not shown) having a cylindrical shape and a plurality of teeth (not shown) protruding from the yoke in the radial direction. In addition, the coils 320 may be wound around the teeth.

The insulator 330 insulates the stator core 310 from the coils 320. Accordingly, the insulator 330 may be disposed between the stator core 310 and the coils 320.

Accordingly, the coils 320 may be wound around the teeth of the stator core 310 on which the insulator 330 is disposed.

The rotor 400 may be disposed inside the stator 300. In addition, the shaft 500 may be coupled to a central portion thereof.

In addition, the rotor 400 may be formed so that magnets 420 are coupled to a rotor core 410. In this case, the rotor 400 may be formed as a surface permanent magnet (SPM) type rotor in which the magnets 420 are disposed at an outer side of the rotor core 410.

The rotor core 410 may be manufactured by coupling a plurality of divided cores or manufactured as a single core form including one container. Alternatively, the rotor core 410 may be formed in a form in which a plurality of plates having thin plate shapes are stacked. In this case, the plate may be a steel plate.

The magnets 420 may generate a rotating magnetic field with the coils 320 wound around the stator 300. The magnets 420 may be disposed so that N-poles and S-poles are alternately positioned in a circumferential direction about a center of the shaft 500.

Accordingly, the rotor 400 rotates due to an electric interaction between the coils 320 and the magnets 420, and when the rotor 400 rotates, the shaft 500 rotates to generate a driving force of the motor 1.

As illustrated in FIG. 1, the shaft 500 may be disposed in the housing 100 and rotatably supported by the bearings 100. In addition, the shaft 500 may rotate with the rotor 400 in conjunction with the rotation of the rotor 400.

The busbar 600 may be disposed on the stator 300.

The busbar 600 may be electrically connected to the coils 320 of the stator 300. Accordingly, power applied from the outside may be transmitted to the coils 320 through the busbar 600.

Figure 2:
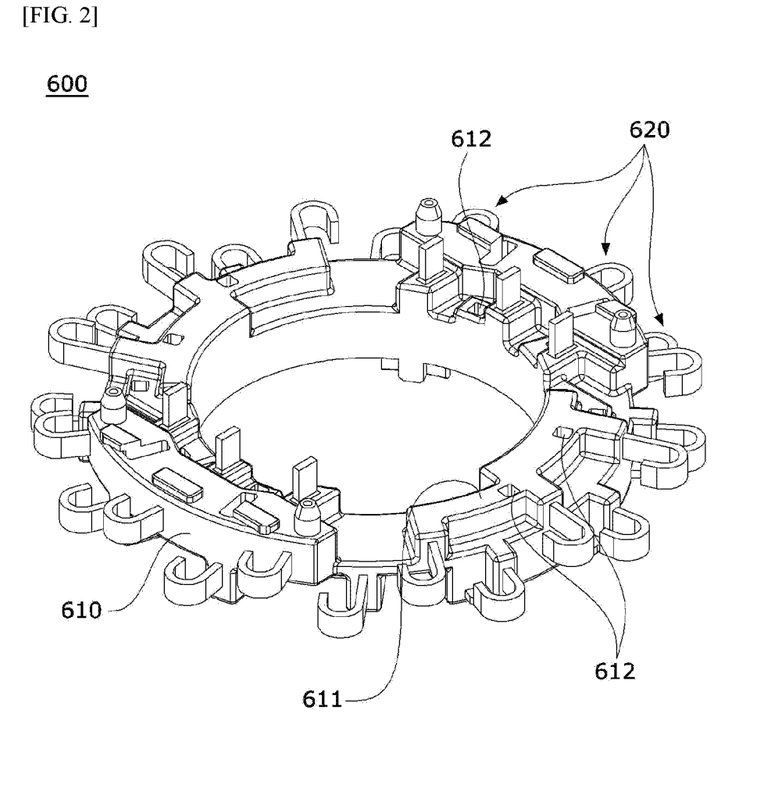
FIG. 2 is a perspective view illustrating a busbar of the motor according to the embodiment.
Figure 3:
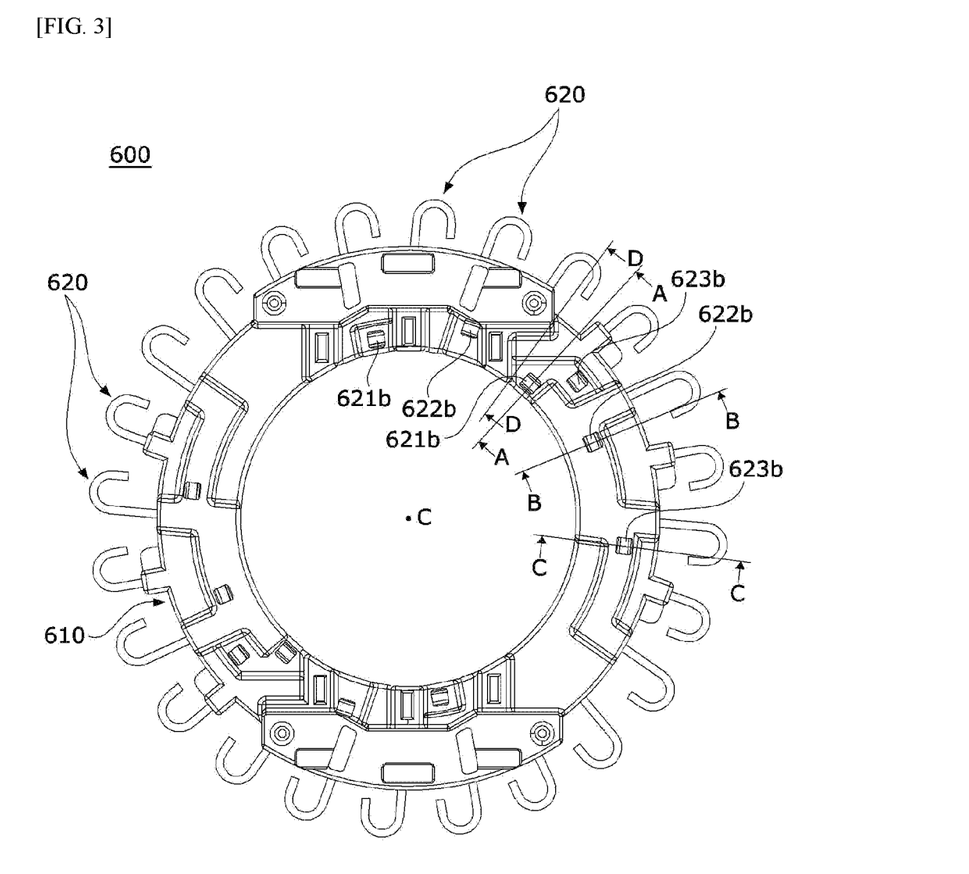
FIG. 3 is a plan view illustrating the busbar of the motor according to the embodiment.
Figure 4:
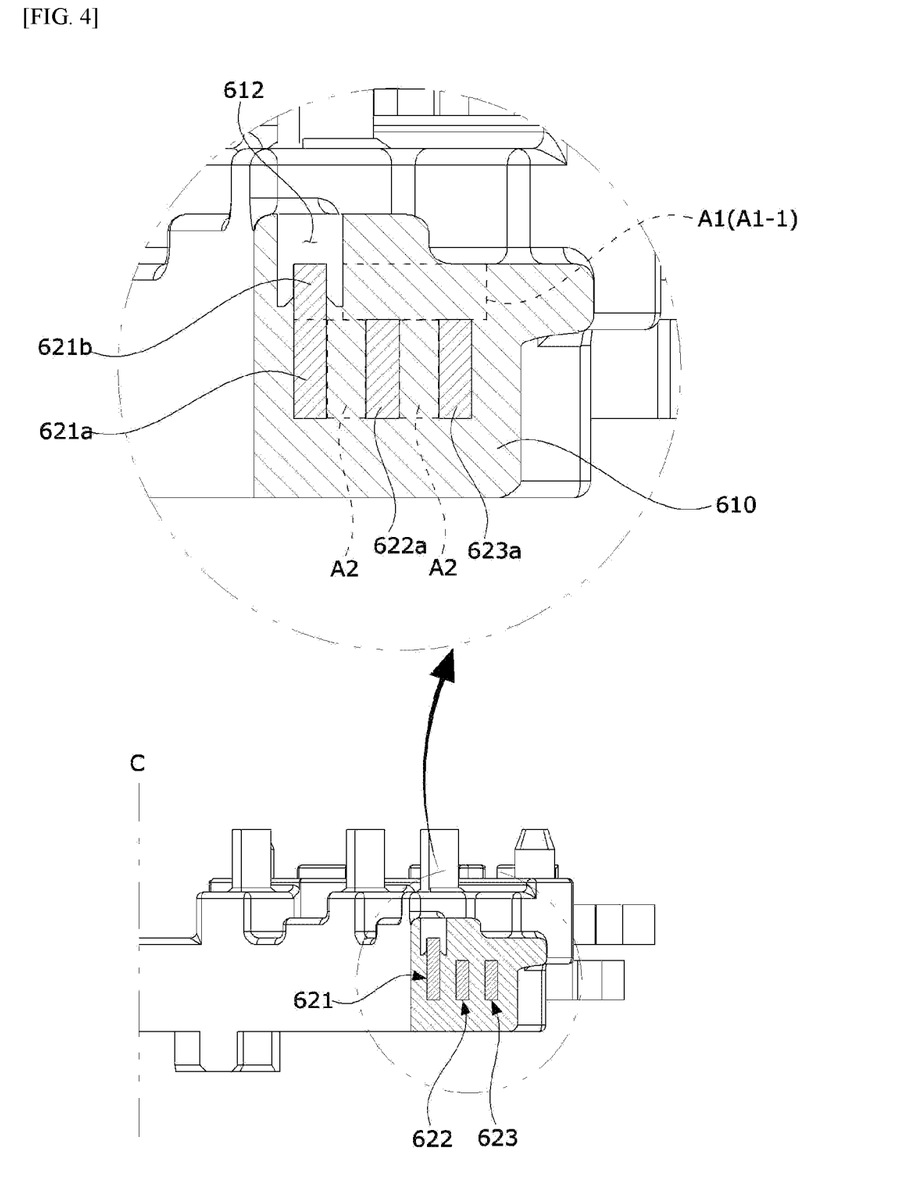
FIG. 4 is a cross-sectional view along line A-A of FIG. 3.
Figure 5:
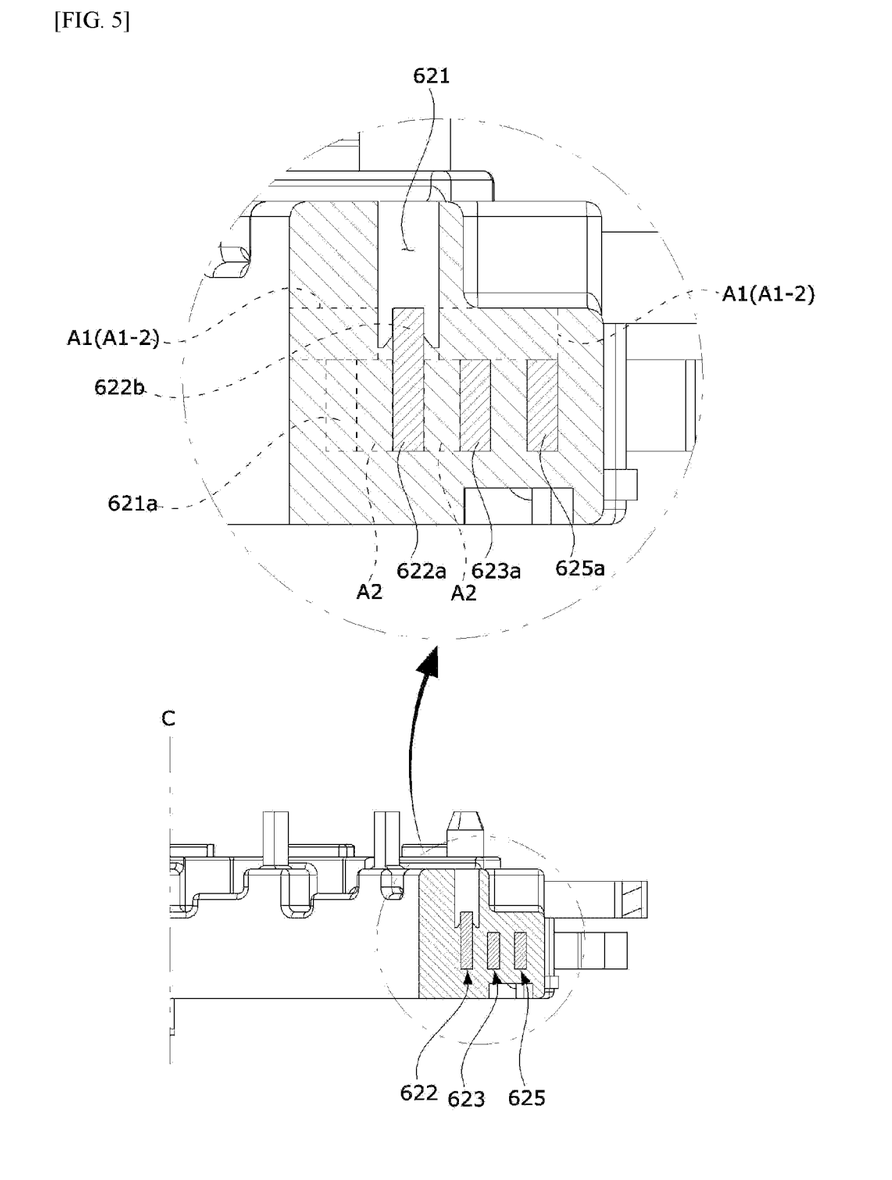
FIG. 5 is a cross-sectional view along line B-B of FIG. 3.
Figure 6:
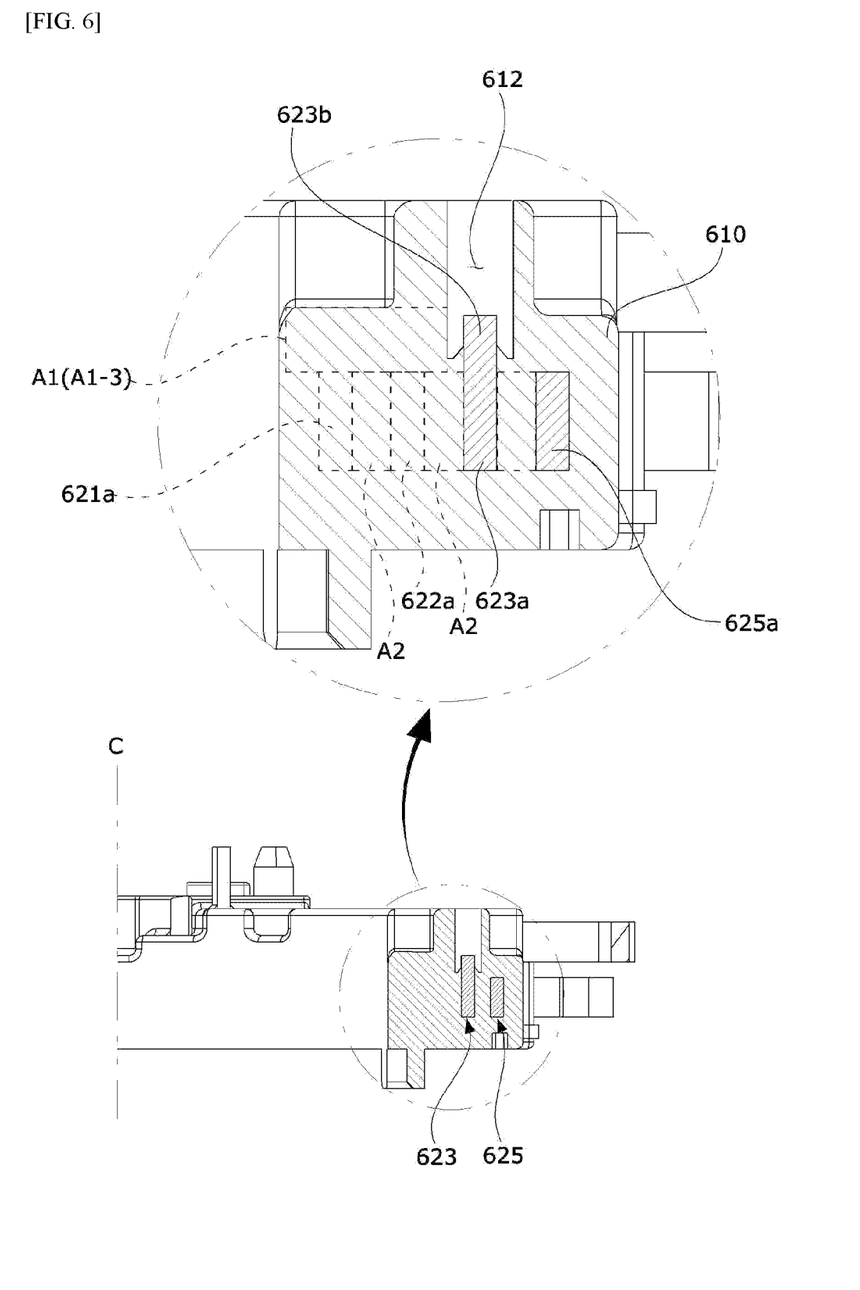
FIG. 6 is a cross-sectional view along line C-C of FIG. 3.
Figure 7:
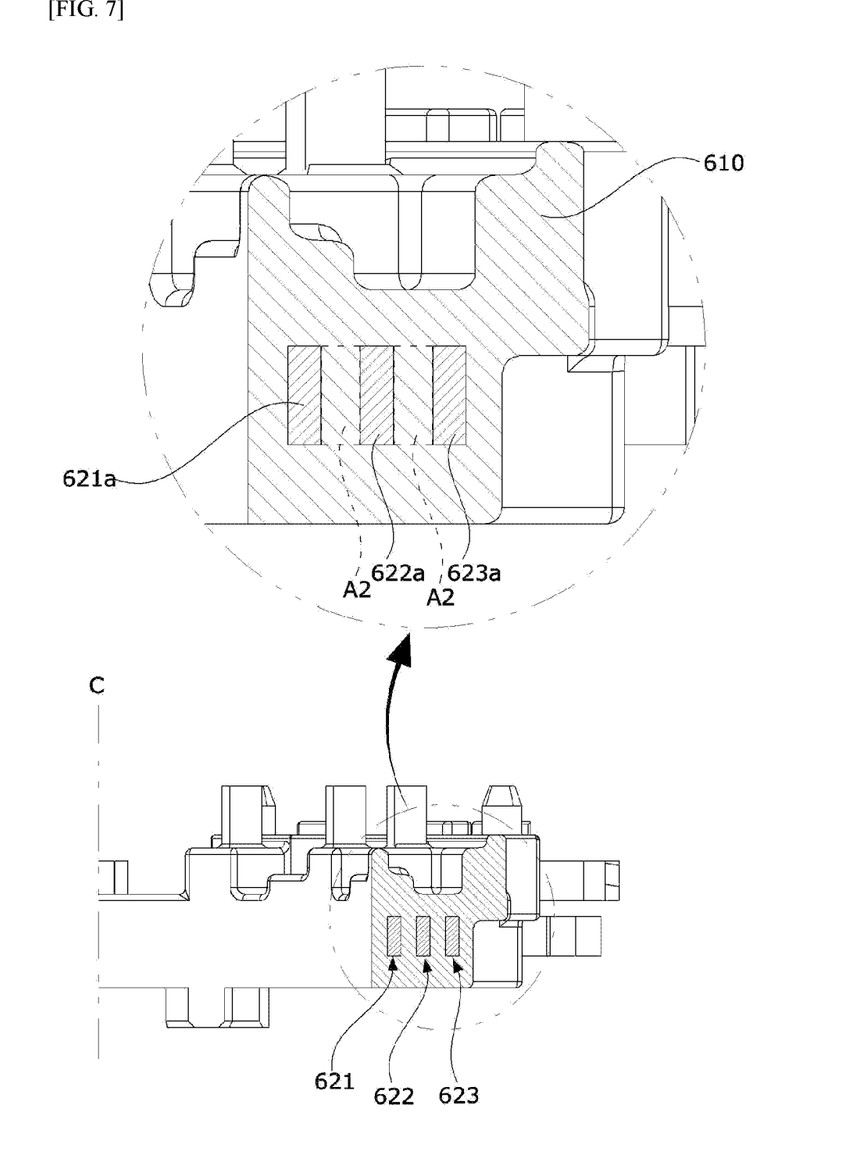
FIG. 7 is a cross-sectional view along line D-D of FIG. 3.
Figure 8:
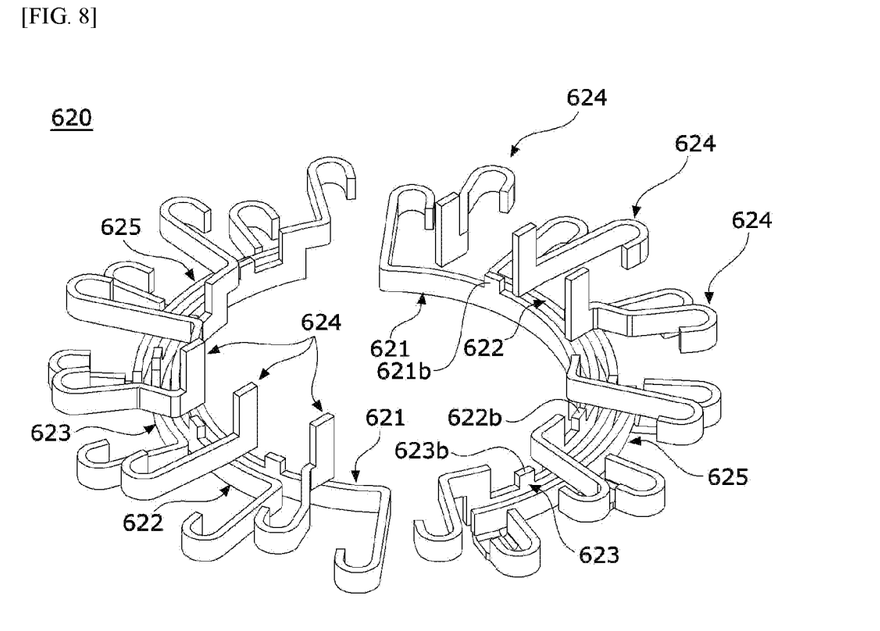
FIG. 8 is a perspective view illustrating terminals of the busbar disposed in the motor according to the embodiment.
Figure 9:
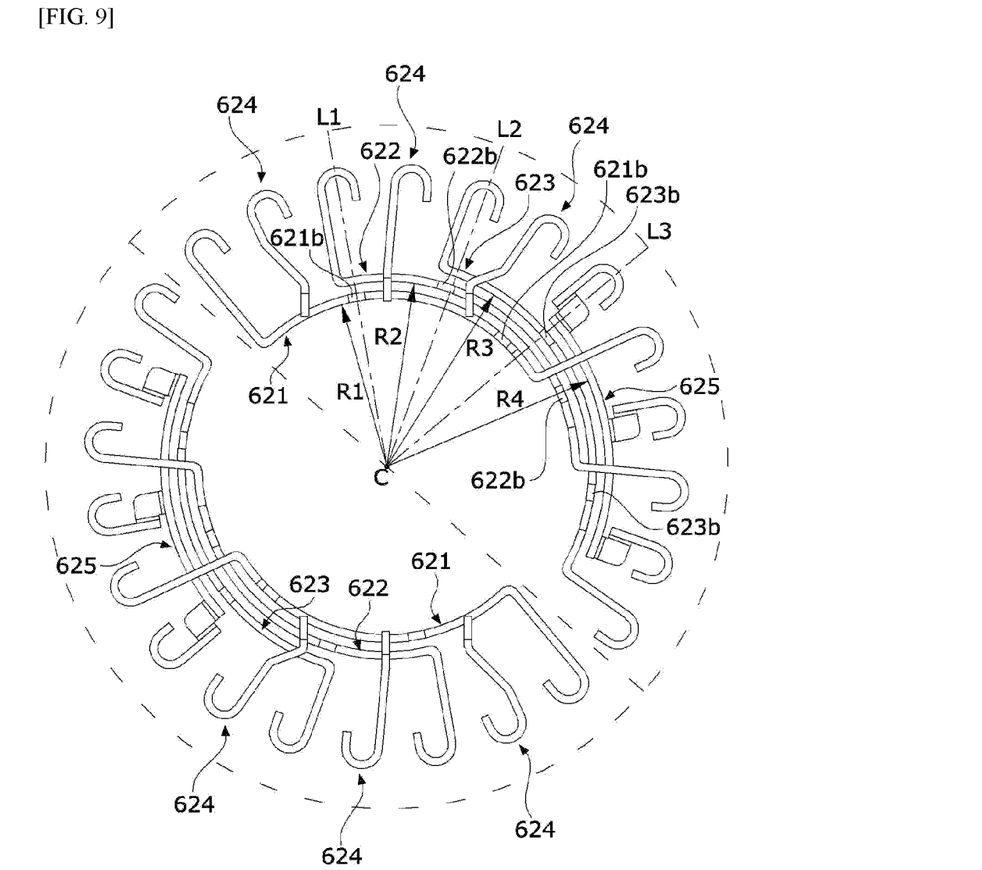
FIG. 9 is a plan view illustrating the terminals of the busbar disposed in the motor according to the embodiment.
Figure 10:
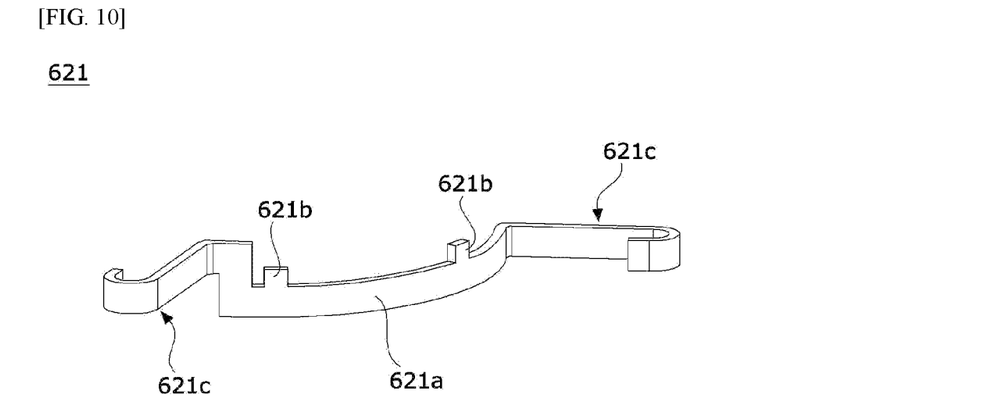
FIG. 10 is a view illustrating a first terminal of the terminals of the busbar disposed in the motor according to the embodiment.
Figure 11:
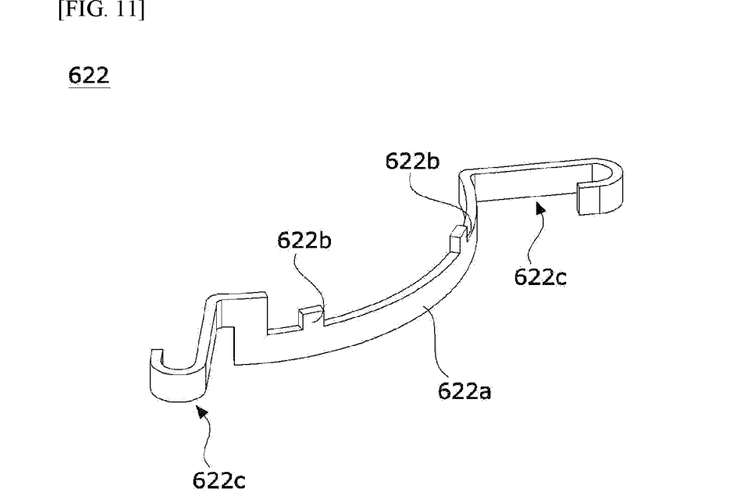
FIG. 11 is a view illustrating a second terminal of the terminals of the busbar disposed in the motor according to the embodiment.
Figure 12:
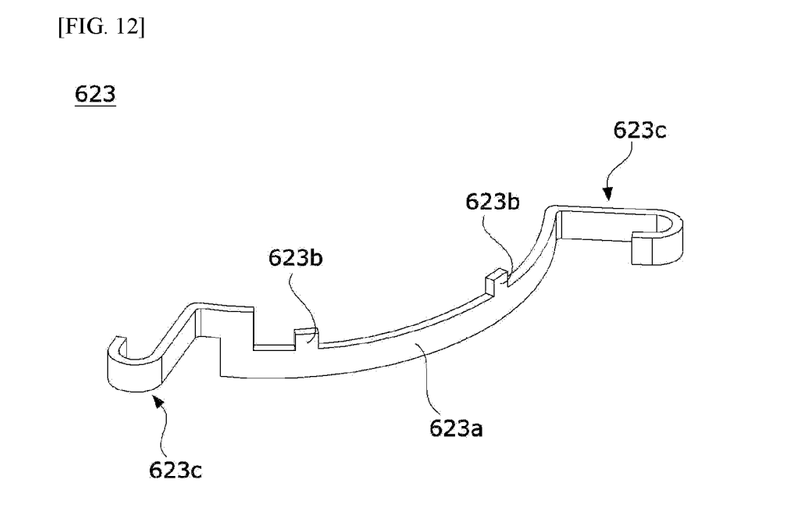
FIG. 12 is a view illustrating a third terminal of the terminals of the busbar disposed in the motor according to the embodiment.

FIG. 2 is a perspective view illustrating the busbar of the motor according to the embodiment, and FIG. 3 is a plan view illustrating the busbar of the motor according to the embodiment. FIG. 4 is a cross-sectional view along line A-A of FIG. 3, FIG. 5 is a cross-sectional view along line B-B of FIG. 3, FIG. 6 is a cross-sectional view along line C-C of FIG. 3, and FIG. 7 is a cross-sectional view along line D-D of FIG. 3. FIG. 8 is a perspective view illustrating terminals of the busbar disposed in the motor according to the embodiment, and FIG. 9 is a plan view illustrating the terminals of the busbar disposed in the motor according to the embodiment. FIG. 10 is a view illustrating a first terminal of the terminals of the busbar disposed in the motor according to the embodiment, FIG. 11 is a view illustrating a second terminal of the terminals of the busbar disposed in the motor according to the embodiment, and FIG. 12 is a view illustrating a third terminal of the terminals of the busbar disposed in the motor according to the embodiment.

Referring to FIGS. 2 to 12, the busbar 600 may include a busbar holder 610 and a plurality of terminals 620 disposed on the busbar holder. In this case, the busbar holder 610 may be referred to as a busbar body.

The busbar holder 610 may be formed of a resin material such as a synthetic resin. In addition, the busbar holder 610 may be formed through an injection molding manner. For example, the busbar 600 may be formed through a method of injecting a molded part on the plurality of terminals 620 to form the busbar holder 610.

That is, the busbar holder 610 may be a molded part formed through the injection molding manner using an insulation material. In addition, when the busbar holder 610 is injection-molded, since the molded part fills between the terminals 620, the insulation performance can be secured.

Meanwhile, the busbar holder 610 may include grooves 612 formed in an upper surface 611. As illustrated in FIG. 2, the grooves 612 may be concavely formed in the upper surface 611 in the axial direction.

In addition, protrusions of the terminals 620 may be disposed in the grooves 612. For example, the grooves 612 may be formed in the upper surface 611 of the busbar holder 610 to expose upper surfaces of the protrusions.

Accordingly, since the molded part forming the busbar holder 610 is disposed in a region overlapping the protrusion of one terminal of the plurality of terminals 620 in the radial direction, the insulation performance between the terminals 620 of the busbar holder 610 can be improved.

For example, since the molded part is disposed in the radial direction from the groove 612 in which the protrusion of one terminal of the plurality of terminals 620 is disposed, and the molded part is disposed in the axial direction from another terminal, the insulation performance between the terminals 620 of the busbar holder 610 can be improved. That is, since the molded part is disposed in a region at which the radial direction from the groove 612 in which the protrusion of one terminal of the plurality of terminals 620 is disposed intersects the axial direction from another terminal, the terminals 620 of the busbar holder 610 may be insulated from each other. In this case, a part of the busbar holder 610 overlapping the protrusion in the radial direction may be referred to as a first region A1.

In addition, as pins (not shown) of a mold disposed to form the busbar 600 guide the protrusions to be positioned at predetermined positions, an insulation distance, which is requested by a user, between the terminals 620 may be maintained. Accordingly, since the insulation distance between the terminals 620 is maintained by the pins in the radial direction, as illustrated in FIG. 7, the molded part is disposed between the plurality of terminals 620 in the radial direction, and thus the terminals 620 may be insulated from each other. In this case, a part of the busbar holder 610 which maintains the insulation distance between the terminals 620 in the radial direction may be referred to as a second region A2.

Meanwhile, the busbar holder 610 may be formed in an annular shape in which a hole is formed to pass through a central portion thereof.

The terminals 620 may be electrically connected to the coils 320 of the stator 300. In this case, the terminals 620 may be disposed in the busbar holder 610 so that parts of the terminals 620 are exposed from the busbar holder 610 and electrically connected to the coils 320. In this case, the terminals 620 may be formed of a metal material.

Referring to FIGS. 4 to 12, the plurality of terminals 620 may include first terminals 621, second terminals 622, and third terminals 623. In addition, the terminals 620 may include power terminals 624 connected to external power sources of U-, V-, and W-phases and neutral terminals 625.

In order to secure stability of the motor 1, the first terminals 621, the second terminals 622, the third terminals 623, the power terminals 624, and the neutral terminals 625 may constitute at least two groups which are electrically connected. In this case, two coils 320 may also be disposed so that the coils 320 of the stator 300 are electrically connected to two groups corresponding thereto.

Accordingly, the first terminal 621, the second terminal 622, the third terminal 623, the power terminal 624, and the neutral terminal 625 constituting one group may be used so that the motor 1 is implemented as a motor of 3-phases divided into U-, V-, W-phases. In this case, two terminal groups may be electrically divided. In addition, the two groups may be spatially or physically divided on the busbar holder 610. Accordingly, when abnormality occurs in a circuit connected to any one group or an element connected to the circuit, the motor 1 may be driven through the other terminal group.

The first terminal 621, the second terminal 622, and the third terminal 623 may be disposed apart from each other. In addition, a part of the busbar holder 610 may be disposed between the first terminal 621, the second terminal 622, and the third terminal 623 to insulate the terminals 621, 622, and 623 from each other.

For example, the terminals 620 may include the first terminal 621 and the second terminal 622 disposed apart from the first terminal 621. In addition, the terminals 620 may include the third terminal 623 disposed apart outward from the first terminal 621 and the second terminal 622 in the radial direction. In addition, since the part of the busbar holder 610 is disposed between the first terminal 621, the second terminal 622, and the third terminal 623, the first terminal 621, the second terminal 622, and the third terminal 623 may be insulated from each other.

Meanwhile, the first terminal 621, the second terminal 622, and the third terminal 623 may respectively include bodies 621a, 622a, and 623a, protrusions 621b, 622b, and 623b extending from upper surfaces which are one surfaces of the bodies 621a, 622a, and 623a in the axial direction, and terminal parts 621c, 622c, and 623c extending from the bodies 621a, 622a, and 623a and electrically connected to end portions of the coils 320.

As illustrated in FIG. 10, the first terminal 621 may include the body 621a, the protrusions 621b extending from the upper surface which is one surface of the body 621a in the axial direction, and the terminal parts 621c extending from the body 621a and electrically connected to the end portions of the coils 320. In this case, the body 621a of the first terminal 621 may be referred to as a first body, the protrusions 621b of the first terminal 621 may be referred to as first protrusions, and the terminal parts 621c of the first terminal 621 may be referred to as first terminal parts.

As illustrated in FIG. 11, the second terminal 622 may include the body 622a, the protrusions 622b extending from an upper surface which is one surface of the body 622a in the axial direction, and the terminal parts 622c extending from the body 622a and electrically connected to the end portions of the coils 320. In this case, the body 622a of the second terminal 622 may be referred to as a second body, the protrusions 622b of the second terminal 622 may be referred to as second protrusions, and the terminal parts 623c of the second terminal 622 may be referred to as second terminal parts.

As illustrated in FIG. 12, the third terminal 623 may include the body 623a, the protrusions 623b extending from an upper surface which is one surface of the body 623a in the axial direction, and the terminal parts 623c extending from the body 623a and electrically connected to the end portions of the coils 320. In this case, the body 623a of the third terminal 623 may be referred to as a third body, the protrusions 623b of the third terminal 623 may be referred to as third protrusions, and the terminal parts 623c of the third terminal 623 may be referred to as third terminal parts. In addition, the upper surfaces may be surfaces toward the cover 200 or surfaces disposed to face the cover 200.

The bodies 621a, 622a, and 623a of the first terminal 621, second terminal 622, and the third terminal 623 may be disposed apart from each other in the radial direction.

Referring to FIGS. 7 and 9, the bodies 621a, 622a, and 623a of the first terminal 621, the second terminal 622, and the third terminal 623 may be sequentially disposed apart from each other in the radial direction about a center C. When seen in the axial direction, the bodies 621a, 622a, and 623a of the first terminal 621, the second terminal 622, and the third terminal 623 may each be formed in an arc shape. In addition, the upper surfaces of the bodies 621a, 622a, and 623a of the first terminal 621, the second terminal 622, and the third terminal 623 may be in contact with the busbar holder 610.

As illustrated in FIG. 9, based on the center C, a radius R1 of the body 621a of the first terminal 621 may be smaller than a radius R2 of the body 622a of the second terminal 622. In addition, the radius R2 of the body 622a of the second terminal 622 may be smaller than a radius R3 of the body 623a of the third terminal 623. Accordingly, the body 622a of the second terminal 622 may be disposed between the body 621a of the first terminal 621 and the body 623a of the third terminal 623 in the radial direction. In this case, the radius R1 of the body 621a of the first terminal 621 may be referred to as a first radius and be a radius from the center C to the first terminal 621 in the radial direction. In addition, the radius R2 of the body 622a of the second terminal 622 may be referred to as a second radius and be a radius from the center C to the second terminal 622 in the radial direction of the. In addition, the radius R3 of the body 623a of the third terminal 623 may be referred to as a third radius and be a radius from the center C to the third terminal 623 in the radial direction.

Accordingly, the second region A2 which is the part of the busbar holder 610 may be disposed between the bodies 621a, 622a, and 623a of the first terminal 621, the second terminal 622, and the third terminal 623 to maintain insulation distances (see FIGS. 4 to 7). In this case, the insulation distances may be maintained by the protrusions 621b, 622b, and 623b of which positions are guided by the pins. In this case, the insulation distances may be distances between the bodies 621a, 622a, and 623a which are disposed apart from each other by the second region A2.

In addition, as illustrated in FIG. 7, a part of the busbar holder 610 may also be disposed on the bodies 621a, 622a, and 623a.

The protrusions 621b, 622b, and 623b of the first terminal 621, the second terminal 622, and the third terminal 623 may be formed to protrude from the upper surfaces of the bodies 621a, 622a, and 623a in the axial direction, respectively.

In addition, a plurality of each of protrusions 621b, 622b, and 623b may each be disposed apart from each other in the circumferential direction. Specifically, two or more of the protrusions 621b, 622b, and 623b may be disposed apart from each other in the circumferential direction. Accordingly, even when an injection pressure is applied to the bodies 621a, 622a, and 623a, two of the protrusions 621b, 622b, and 623b are used instead of one of the protrusion 621b, 622b, or 623b to easily correspond to the injection pressure, and thus the busbar 600 may maintain the insulation distances.

As illustrated in FIG. 10, at least two protrusions 621b of the first terminal 621 may be disposed on the body 621a to be spaced apart from each other in the circumferential direction. That is, the number of the protrusions 621b of the first terminal 621 may be two or more.

As illustrated in FIG. 11, at least two protrusions 622b of the second terminal 622 may be disposed on the body 622a to be spaced apart from each other in the circumferential direction. That is, the number of the protrusions 622b of the second terminal 622 may be two or more.

As illustrated in FIG. 12, at least two protrusions 623b of the third terminal 623 may be disposed on the body 623a to be spaced apart from each other in the circumferential direction. That is, the number of the protrusions 623b of the third terminal 623 may be two or more.

In addition, the protrusions 621b, 622b, and 623b may be disposed not to overlap each other in the radial direction.

That is, each of the protrusions 621b, 622b, and 623b may be disposed with a different radius based on the center C. For example, the protrusion 621b of the first terminal 621 may be disposed on a virtual first line L1, the protrusion 622b of the second terminal 622 may be disposed on a virtual second line L2, and the protrusion 623b of the third terminal 623 may be disposed on a virtual third line L3. In this case, the first line L1 may be a virtual line connecting the center C and a center of the protrusion 621b of the first terminal 621 in the radial direction, the second line L2 may be a virtual line connecting the center C and a center of the protrusion 622b of the second terminal 622 in the radial direction, and the third line L3 may be a virtual line connecting the center C and a center of the protrusion 623b of the third terminal 623 in the radial direction. In this case, the first line L1, the second line L2, and the third line L3 may extend in different directions among radial directions from the center C.

Accordingly, the protrusion 621b of the first terminal 621 is disposed not to overlap the protrusion 622b of the second terminal 622 and the protrusion 623b of the third terminal 623 in the radial direction and the circumferential direction. That is, only the protrusion 621b of the first terminal 621 is disposed on the first line L1, and the protrusion 622b of the second terminal 622 and the protrusion 623b of the third terminal 623 may be disposed apart from the first line L1 in the radial direction. In addition, the protrusion 622b of the second terminal 622 is disposed not to overlap the protrusion 621b of the first terminal 621 and the protrusion 623b of the third terminal 623 in the radial direction and the circumferential direction. That is, only the protrusion 622b of the second terminal 622 may be disposed on the second line L2, and the protrusion 621b of the first terminal 621 and the protrusion 623b of the third terminal 623 may be disposed apart from the second line L2 in the radial direction. In addition, the protrusion 623b of the third terminal 623 is disposed not to overlap the protrusion 621b of the first terminal 621 and the protrusion 622b of the second terminal 622 in the radial direction and the circumferential direction. That is, only the protrusion 623b of the third terminal 623 may be disposed on the third line L3, and the protrusion 621b of the first terminal 621 and the protrusion 622b of the second terminal 622 may be disposed apart from the third line L3 in the radial direction.

In addition, the protrusions 621b, 622b, and 623b may be disposed in the grooves 612. In this case, the protrusions 621b, 622b, and 623b may be disposed in the grooves 612 of the busbar holder 610 to expose upper surfaces of the protrusions 621b, 622b, and 623b.

For example, the upper surface of the protrusion 621b of the first terminal 621 may be disposed in any one of the plurality of the grooves 612 to be exposed, the upper surface of the protrusion 622b of the second terminal 622 may be disposed in another one of the plurality of the grooves 612 to be exposed, and the upper surface of the protrusion 623b of the third terminal 623 may be disposed still another one of the plurality of the grooves 612 to be exposed.

Accordingly, a part of the busbar holder 610 is not disposed on the protrusion 621b of the first terminal 621 due to the groove 612. However, a part of the busbar holder 610 may be disposed to overlap the protrusion 621b of the first terminal 621 in the circumferential direction. Accordingly, a part of the busbar holder 610 may be disposed on and overlap the body 621a of the first terminal 621 formed in an arc shape in the circumferential direction. That is, the protrusion 621b of the first terminal 621 may not overlap the busbar holder 610 in an upward direction and may overlap the busbar holder 610 in the circumferential direction, In addition, a part of the busbar holder 610 is not disposed on the protrusion 622b of the second terminal 622 due to the groove 612. However, a part of the busbar holder 610 may be disposed to overlap the protrusion 622b of the second terminal 622 in the circumferential direction. Accordingly, a part of the busbar holder 610 may be disposed on and overlap the body 622a of the second terminal 622 formed in an arc shape in the circumferential direction.

In addition, a part of the busbar holder 610 is not disposed on the protrusion 623b of the third terminal 623 due to the groove 612. However, a part of the busbar holder 610 may be disposed to overlap the protrusion 623b of the third terminal 623 in the circumferential direction. Accordingly, a part of the busbar holder 610 may be disposed on and overlap the body 623a of the third terminal 623 formed in an arc shape in the circumferential direction.

Meanwhile, the first region A1 which is a part of the busbar holder 610 may be disposed to overlap the protrusions 621b, 622b, and 623b in the radial direction. For example, although the protrusions 621b, 622b, and 623b are disposed in the grooves 612 to be exposed, parts of the busbar holder 610 are disposed on the protrusions 621b, 622b, and 623b in the radial direction to be spaced apart from each other to constitute the first region A1.

As illustrated in FIG. 4, a 1-1 region A1-1 of the first region A1 of the busbar holder 610 may be disposed to overlap the protrusion 621b of the first terminal 621 in the radial direction. In this case, the 1-1 region A1-1 may be disposed on the body 622a of the second terminal 622 and the body 623a of the third terminal 623.

As illustrated in FIG. 5, a 1-2 region A1-2 of the first region A1 of the busbar holder 610 may be disposed to overlap the protrusion 622b of the second terminal 622 in the radial direction. In this case, the 1-2 region A1-2 may be disposed on the body 621a of the first terminal 621 and the body 623a of the third terminal 623.

As illustrated in FIG. 6, a 1-3 region A1-3 of the first region A1 of the busbar holder 610 may be disposed to overlap the protrusion 623b of the third terminal 623 in the radial direction. In this case, the 1-3 region A1-3 may be disposed on the body 621a of the first terminal 621 and the body 622a of the second terminal 622.

The terminal parts 621c, 622c, and 623c may be formed to protrude from the bodies 621a, 622a, and 623a in the radial direction. In this case, end portions of the terminal parts 621c, 622c, and 623c may be bent to be electrically connected to the coils 320. In this case, the terminal parts 621c, 622c, and 623c may be referred to as bent parts or hook parts because of shapes thereof.

In addition, the plurality of each of terminal parts 621c, 622c, and 623c may be disposed on the bodies 621a, 622a, and 623a to be spaced apart from each other in the circumferential direction, respectively. In this case, the protrusions 621b, 622b, and 623b may be disposed on the bodies 621a, 622a, and 623a between the terminal parts 621c, 622c, and 623c in the circumferential direction, respectively. In addition, a part of the busbar holder 610 may be disposed between the terminal parts 621c, 622c, and 623c and the protrusions 621b, 622b, and 623b.

Referring to FIGS. 8 to 10, the terminal parts 621c of the first terminal 621 may be formed to protrude from two end portions of the body 621a in the radial direction. In this case, the terminal parts 621c of the first terminal 621 may be disposed to be exposed from the busbar holder 610.

Referring to FIGS. 8, 9, and 11, the terminal parts 622c of the second terminal 622 may be formed to protrude from two end portions of the body 622a in the radial direction. In this case, the terminal parts 622c of the second terminal 622 may be disposed to be exposed from the busbar holder 610.

Referring to FIGS. 8, 9, and 12, the terminal parts 623c of the third terminal 623 may be formed to protrude from two end portions of the body 623a in the radial direction. In this case, the terminal parts 623c of the third terminal 623 may be disposed to be exposed from the busbar holder 610.

The power terminals 624 may be disposed on the busbar holder 610 to transmit power applied from the outside to the coils 320. Accordingly, one sides the power terminals 624 may be connected to the external power sources through the cables (not shown), and the other sides may be electrically connected to the coils 320. In this case, the other sides of the power terminals 624 may be formed in shapes which are the same as those of the terminal parts 621c, 622c, and 623c.

In addition, the power terminals 624 may be disposed above the first terminals 621, the second terminals 622, and the third terminals 623 in the axial direction.

The neutral terminals 625 may be electrically connected to the coils 320.

Figure 13:
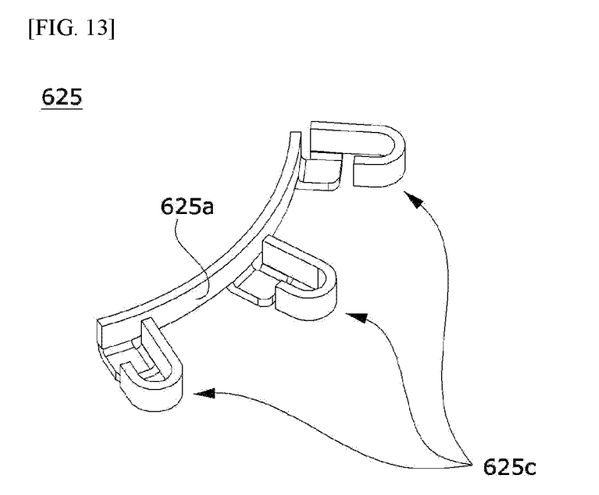
FIG. 13 is a view illustrating a neutral terminal of the terminals of the busbar disposed in the motor according to the embodiment.

FIG. 13 is a view illustrating the neutral terminal of the terminals of the busbar disposed in the motor according to the embodiment.

Referring to FIG. 13, the neutral terminal 625 may include a body 625a and terminal parts 625c extending from the body 625a and electrically connected to end portions of the coils 320. In this case, the terminal parts 625c of the neutral terminal 625 may be formed in shapes which are the same as those of the terminal parts 621c, 622c, and 623c.

In addition, the neutral terminal 625 may be disposed outside the first terminal 621, the second terminal 622, and the third terminal 623 in the radial direction.

Referring to FIG. 9, the body 625a of the neutral terminal 625 may be formed to have a predetermined radius R4 about the center C, and the radius R4 may be referred to as a fourth radius. In this case, the fourth radius may be a radius from the center C to the neutral terminal 625 in the radial direction. In addition, the radius R4 of the body 625a of the neutral terminal 625 may be greater than the radius R3 of the body 623a of the third terminal 623.

In addition, the plurality of terminal parts 625c may be disposed on the body 625a to be spaced apart from each other in the circumferential direction.

Meanwhile, an example of the neutral terminal 625 without protrusions unlike the protrusions formed on the first terminal 621, the second terminal 622, and the third terminal 623 has been described, but the present invention is not necessarily limited thereto. For example, protrusions may also be formed on the neutral terminal 625 like the first terminal 621, the second terminal 622, and the third terminal 623.

The sensor part 700 may detect a position of the rotor 400 by detecting a magnetic force of sensing magnets installed to operate in conjunction with rotation of the rotor 400 to detect rotation of the shaft 500.

The sensor part 700 may include a sensing magnet assembly 710 and a printed circuit board (PCB) 720.

The sensing magnet assembly 710 is coupled to the shaft 500 to operate in conjunction with the rotation of the rotor 400 to detect the position of the rotor 400. In this case, the sensing magnet assembly 710 may include the sensing magnets and a sensing plate. The sensing magnets and the sensing plate may be coaxially coupled.

The sensing magnets may include main magnets disposed adjacent to a hole forming an inner circumferential surface thereof in the circumferential direction and sub-magnets formed at an edge thereof.

The main magnets may be arranged in the same way as the magnets 420 of the rotor 400 of the motor.

The sub-magnets may be divided further than the main magnets so that the sub-magnets may be formed to have poles of which the number is greater than the number of poles of the main magnets. Accordingly, a rotation angle of the rotor 400 may be divided and measured more precisely, and thus the motor 1 can be driven more smoothly.

The sensing plate may be formed of a disc type metal material. In addition, the sensing magnets may be coupled to an upper surface of the sensing plate. In addition, the sensing plate may be coupled to the shaft 500. In this case, a hole through which the shaft 500 passes may be formed in the sensing plate.

A sensor which detects the magnetic force of the sensing magnets may be disposed on the PCB 720. In this case, the sensor may be provided as a Hall integrated circuit (IC). In addition, the sensor may detect changes in an N-pole and an S-pole of the sensing magnets and generate a sensing signal.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS

1: MOTOR
100: HOUSING
200: COVER
240: HOLE
300: STATOR
310: STATOR CORE
320: COIL
330: INSULATOR
400: ROTOR
500: SHAFT
600: BUSBAR
610: BUSBAR HOLDER
612: GROOVE
620: TERMINAL
621: FIRST TERMINAL
622: SECOND TERMINAL
623: THIRD TERMINAL
621B, 622B, 623B: PROTRUSION
700: SENSOR PART

The invention claimed is:

1. A motor comprising:
   a stator;
   a rotor disposed inside the stator;
   a shaft coupled to the rotor;
   a busbar configured to distribute external power to the stator,
   wherein the busbar includes a busbar holder and a plurality of terminals disposed on the busbar holder,
   wherein the plurality of terminals includes a first terminal, a second terminal, a third terminal disposed spaced apart from each other, and a power terminal with one side extending in an axial direction and connected to an external power source,
   wherein each of the first terminal, the second terminal, and the third terminal includes a body disposed in the busbar holder, a protrusion protruding from the body in the axial direction, and terminal parts spaced apart from the protrusion and extending from the body,
   wherein the terminal parts are coupled to coils of the stator,
   wherein a groove for accommodating the protrusion is formed in the busbar holder, and
   wherein the power terminal is disposed above the first terminal, the second terminal, and the third terminal in the axial direction.

2. The motor of claim 1, wherein the groove is formed in an upper surface of the busbar holder so that an upper surface of the protrusion is visible in the axial direction.

3. The motor of claim 1, wherein the second terminal is disposed between the first terminal and the third terminal, and
   wherein a radius (R1) of the first terminal is smaller than a radius (R2) of the second terminal.

4. The motor of claim 1, wherein the protrusion is disposed between the terminal parts.

5. The motor of claim 1, wherein the protrusion of the first terminal is provided as two or more protrusions.

6. The motor of claim 5, wherein the two or more protrusions are disposed apart from each other in a circumferential direction.

7. The motor of claim 1, wherein the plurality of terminals includes a neutral terminal.

* * * * *